United States Patent [19]

Striebich

[11] 4,294,074

[45] Oct. 13, 1981

[54] DRIVE ASSEMBLY, ESPECIALLY FOR MOTOR VEHICLES

[75] Inventor: Helmut Striebich, Karlsruhe, Fed. Rep. of Germany

[73] Assignee: Dr. Ing. h.c. F. Porsche Aktiengesellschaft, Stuttgart, Fed. Rep. of Germany

[21] Appl. No.: 972,211

[22] Filed: Dec. 22, 1978

[30] Foreign Application Priority Data

Dec. 12, 1977 [DE] Fed. Rep. of Germany ....... 2757236

[51] Int. Cl.³ .......................... F01K 23/10; F02C 1/04
[52] U.S. Cl. ......................................... 60/616; 60/682
[58] Field of Search ................. 60/616, 617, 618, 682, 60/650, 39.19, 39.51 R, 39.51 H; 415/114

[56] References Cited

U.S. PATENT DOCUMENTS

| | | | |
|---|---|---|---|
| 2,109,237 | 2/1938 | Lustig | 60/618 X |
| 2,283,176 | 5/1942 | Birmann | 60/682 X |
| 2,443,717 | 6/1948 | Birmann | 60/616 |

Primary Examiner—Michael Koczo, Jr.
Attorney, Agent, or Firm—Craig and Antonelli

[57] ABSTRACT

A drive assembly, especially for motor vehicles, of the type comprising an internal combustion engine and an exhaust gas turbine unit including an exhaust gas driven turbine is improved by virtue of structure for utilizing the heat energy of the exhaust gases of the internal combustion engine in addition to the kinetic energy. According to a preferred embodiment, the exhaust gas turbine unit comprises, in addition to the exhaust gas turbine, a compressor and a secondary turbine for deriving power from the heat energy of the exhaust gases. Still further, another feature includes the provision of a heat exchanger for transferring thermal energy from the exhaust gases to a working medium after the working medium has been compressed by the compressor, the heat exchanger being formed by hollow blades of the exhaust gas driven turbine.

9 Claims, 7 Drawing Figures

DRIVE ASSEMBLY, ESPECIALLY FOR MOTOR VEHICLES

BACKGROUND AND SUMMARY OF THE INVENTION

The invention relates to a drive assembly, especially for motor vehicles, of the type comprising an internal combustion engine and an exhaust gas turbine unit equipped with an exhaust gas turbine driven by the exhaust gases of the internal combustion engine.

Studies of the energy balance in a motor vehicle, performed on a water-cooled gasoline-powered internal combustion engine, produced an energy distribution wherein the energy supplied to the internal combustion engine by the fuel is expended as follows: approximately 35% with the exhaust gases, approximately 20% with the cooling water, and approximately 20% by heat radiation, so that only 25% useful internal combustion engine work acts on the crankshaft (FIG. 1 and Bosch Handbook of Auto Engineering, 18th Edition). From the above, it is clear that a considerable part of the fuel energy losses is attributable to the exhaust gases alone. This loss with the exhaust gases consists on the one hand of kinetic energy (exhaust gas exit velocity) and on the other hand of heat energy (high exhaust gas temperatures).

It is known that a portion of the theoretically achievable power is lost by the design-related incomplete expansion in reciprocating-piston internal combustion engines. This power loss $L_V$, depending on the operating state of the internal combustion engine, is between 20 and 40% of the rated power $L_1$ (FIG. 2).

Methods are known for reusing a portion of this energy. The best known such method is exhaust gas turbocharging. In this method, the exhaust gases drive an exhaust gas turbine mounted on a common shaft with a compressor. The compressor draws in fresh air, compresses it, and pumps it to the internal combustion engine. Other methods include the so-called compound system, wherein the power which can be provided by the exhaust gas turbine is fed back again to the drive shaft of the internal combustion engine, thus contributing to an increase in the efficiency of the internal combustion engine. However, the thermal energy of the exhaust gases remains unused in both methods.

On the other hand, it is known to use the heat energy of the exhaust gases for heating purposes (German Pat. No. 873,461) and to generate steam (German Auslegeschrift No. 1,157,430). The exhaust gases constitute an easily exploited heat reserve and are used for heating purposes unrelated to the operation of the internal combustion engine. However, this utilization of the heat energy has no effect upon the effective efficiency of the internal combustion engine. The steam generated by the heat energy from the exhaust gases can be used for steam turbines or steam engines, but still has no effect upon the effective power of the internal combustion engine.

The goal of the invention is to provide a drive assembly, especially for motor vehicles, wherein the amounts and types of energy residing in the exhaust gases can be utilized in such manner that the effective efficiency of the internal combustion engine is considerably increased by comparison with known drive assemblies.

This goal is achieved according to the invention by virtue of the fact that both the kinetic energy and the heat energy of the exhaust gases from the internal combustion engine are used by a thermal work process superimposed in the exhaust gas turbine of the exhaust gas turbine unit. The exhaust gas turbine unit comprises a compressor, a secondary turbine, and an exhaust gas turbine, whereby the turbine blades of the exhaust gas turbine are formed by hollow blades, through which the working medium compressed by the compressor flows, said medium expanding to release power in the secondary turbine. Since the kinetic energy of the exhaust gases is utilized directly by the exhaust gas turbine and the utilization of the heat energy of the exhaust gases is utilized indirectly by the exhaust gas turbine, with the latter operating as a heat exchanger and heating the working medium which has been compressed, a considerable recovery of power can be achieved in the exhaust gas turbine unit. This power can then either be fed directly back to the internal combustion engine or this power can be used to drive a generator for example, whose electrical energy can then be used to relieve the load on the internal combustion engine for performing a wide variety of duties, for example, driving accessories or for heating. In addition, the utilization of the heat energy of the exhaust gases according to the invention, by heat exchange between the exhaust gas turbine and the compressed medium, subjects the exhaust gas turbine unit to only slight thermal stresses. The working medium according to the invention can be air, steam, or the like, and the secondary turbine can consist of a single-stage or multi-stage axial or radial turbine. It has been found to be especially advantageous to make the exhaust gas turbine unit an integral unit. This results in the exhaust gas turbine unit occupying a small, compact volume, which is especially advantageous because of the small amount of available space, especially in motor vehicles.

These and further objects, features and advantages of the present invention will become more obvious from the following description when taken in connection with the accompanying drawings which shows, for purposes of illustration only, plural embodiments in accordance with the present invention; and wherein

DETAILED DESCRIPTION OF PREFERRED EMBODIMENT

Figure 1:
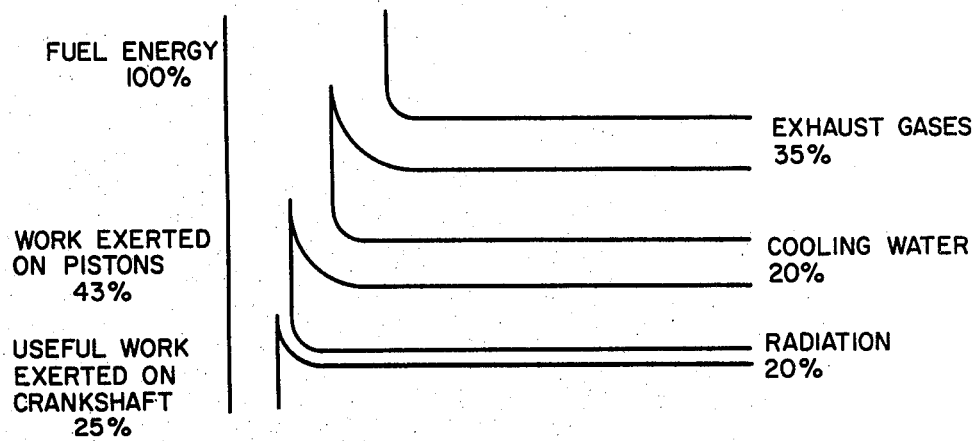
FIG. 1 shows the energy distribution of the energy balance of a water-cooled gasoline internal combustion engine.
Figure 2:
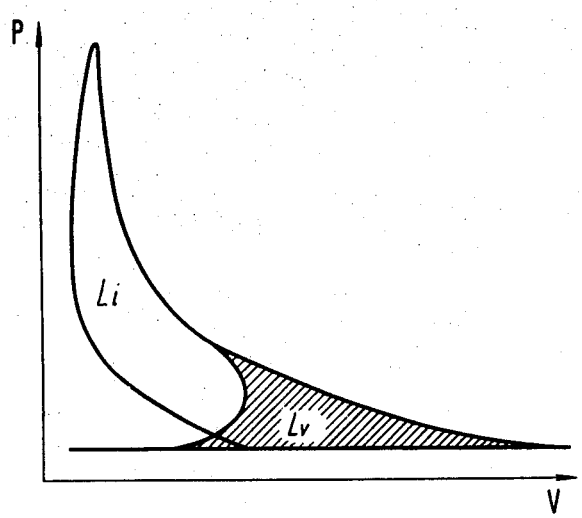
FIG. 2 shows the utilization of kinetic energy from exhaust gases of an internal combustion engine on a PV diagram.
Figure 3:
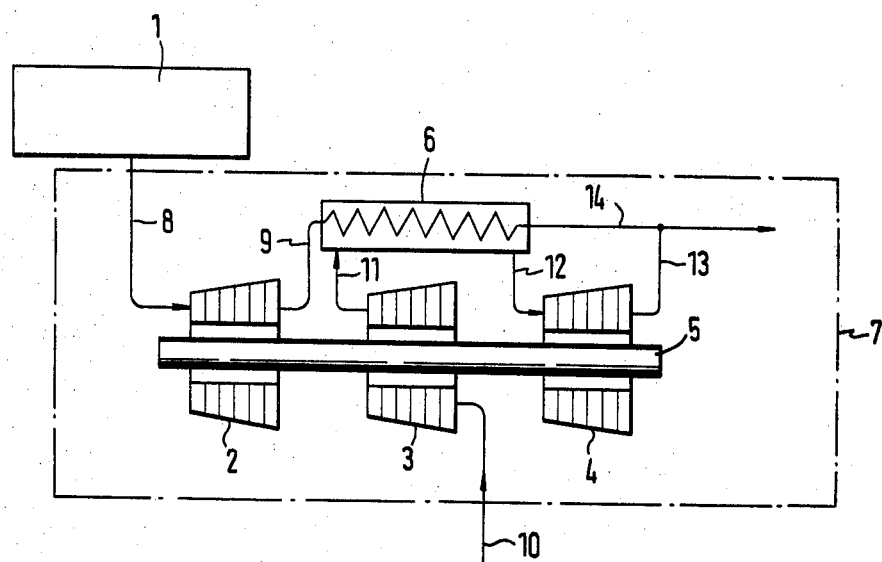
FIG. 3 shows the drive assembly as a schematic block diagram.

In the embodiment of the invention shown in FIG. 3 as a block diagram, 1 represents an internal combustion engine and 2 is an exhaust gas turbine driven by the exhaust gases of internal combustion engine 1, said exhaust gas turbine being mounted on a common shaft 5 with a compressor 3 and a secondary turbine 4, the latter being either a single-stage or multi-stage axial or radial turbine. Exhaust gas turbine 2, compressor 3, and secondary turbine 4 are operationally linked to a heat exchanger 6 and constitute an exhaust gas turbine unit 7 together with the latter. An exhaust gas line running from internal combustion engine 1 to exhaust gas turbine 2 is designated 8 and an exhaust gas line running from exhaust gas turbine 2 to heat exchanger 6 is designated 9. A working medium is supplied to compressor 3 through an intake line 10, said medium being supplied by the compressor to heat exchanger 6 by an air line 11. The required working medium can be air, steam, or the like, but for the purpose of the following explanations it is assumed that the medium is air. The exhaust gases and compressed air are fed through heat exchanger 6, whence the air is then fed from the heat exchanger through an air line 12 to secondary turbine 4 and from the latter through an air line 13 to an exhaust gas line 14.

The theory of operation of the invention is as follows:

After internal combustion engine 1 is started, its exhaust gases drive exhaust gas turbine 2 and the latter drives compressor 3. The air, drawn in by compressor 3 and compressed, is fed through air line 11, and the exhaust gases are fed through exhaust gas line 9 to heat exchanger 6. In heat exchanger 6, heat exchange takes place between the hot exhaust gases and the compressed air. The air, heated in heat exchanger 6, passes through air line 12 to reach secondary turbine 4, expands therein to release power, and is then guided back from the latter through the air line 13 to exhaust gas line 14, through which the air and exhaust gases are discharged into the atmosphere.

Figure 4:
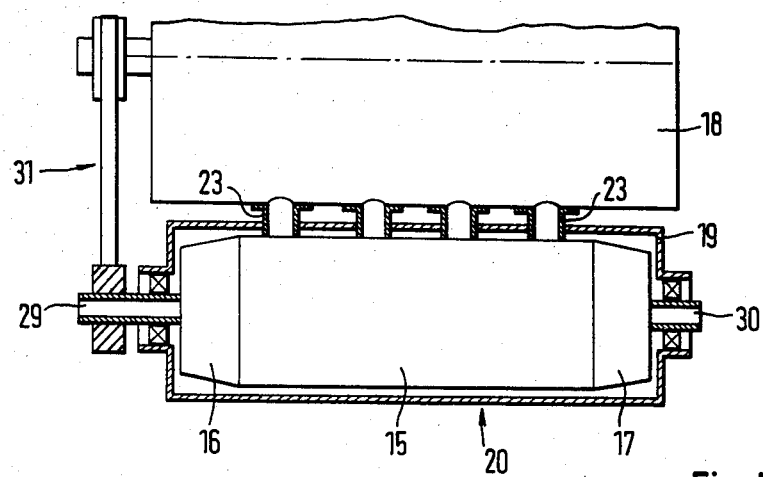
FIG. 4 shows the exhaust gas turbine unit as an integrated design in schematic form.
Figure 5:
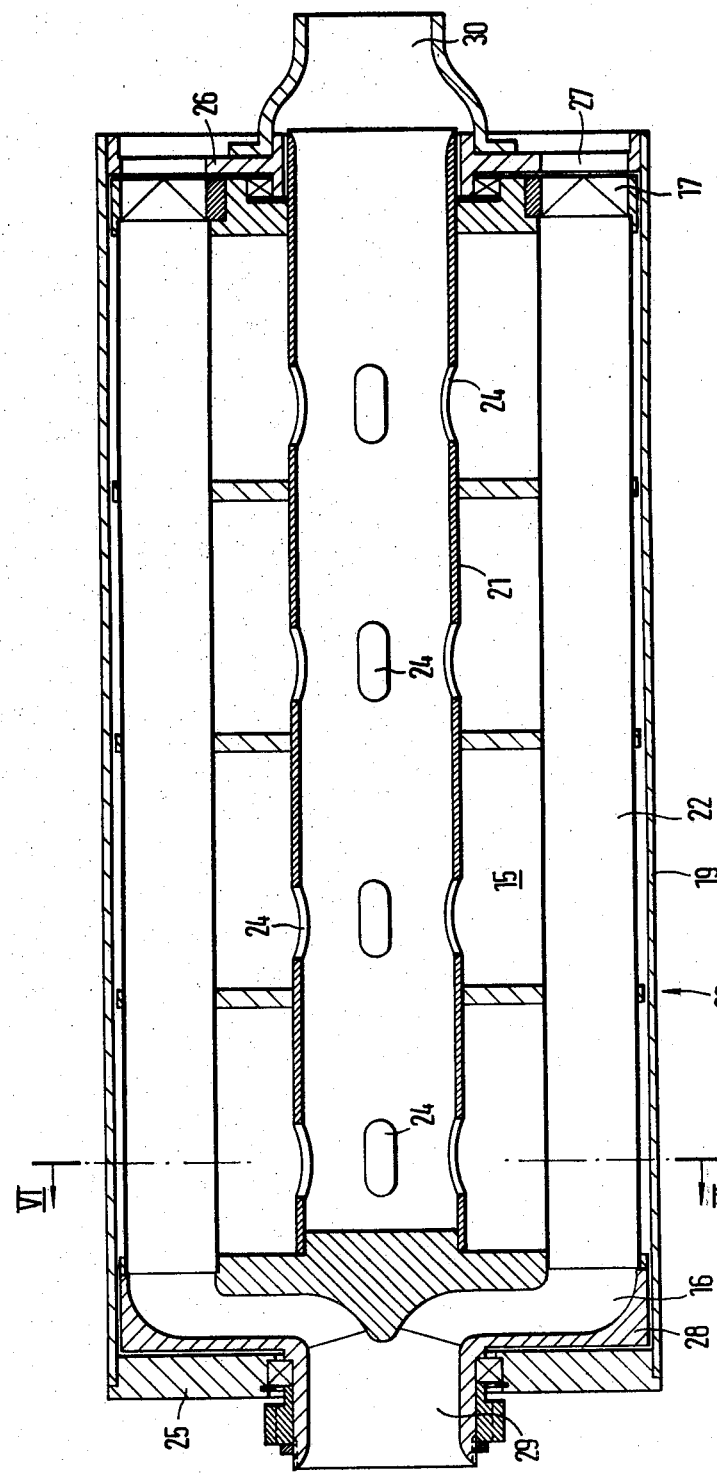
FIG. 5 is a lengthwise section through the exhaust gas turbine unit.
Figure 6:
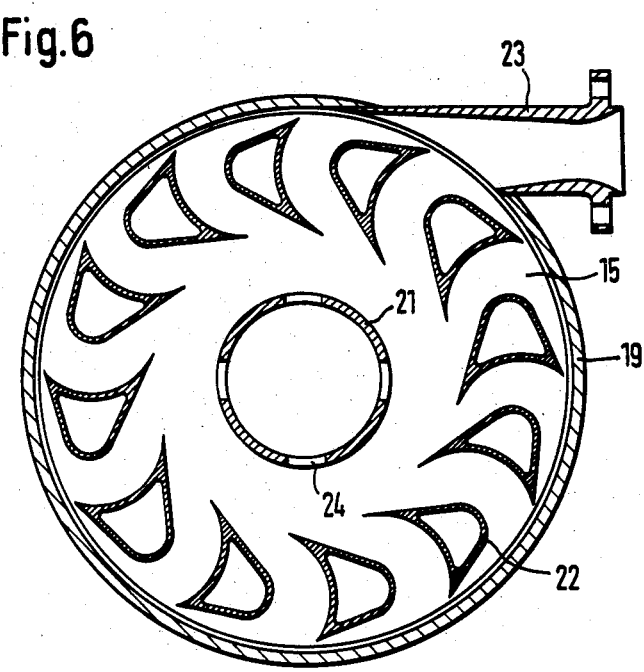
FIG. 6 is a cross section through the exhaust gas turbine unit along line VI—VI in FIG. 5.

FIGS. 4 to 6 show the subject of the application in an integrated design. An exhaust gas turbine 15, a compressor 16, and a secondary turbine 17 are diposed together in a housing 19 flanged to an internal combustion engine 18, and together constitute an exhaust gas turbine unit 20. The exhaust gas turbine unit comprises a central tube 21, said tube being firmly attached to turbine blades 22 of exhaust gas turbine 15, said blades being in the form of hollow blades, to compressor 16, and to secondary turbine 17, said tube further being mounted rotatably in housing 19. Exhaust gas inlet stubs in housing 19 are designated 23 and openings in central tube 21 are designated 24. End walls 25 and 26 of housing 19 constitute the bearing points for central tube 21, whereby end wall 26 is provided with openings 27 in the area of turbine blades 22. The left part 28 of compressor 16 is provided with an opening 29 for air intake and the opposite side of housing 19 is provided with an opening 30 to carry off the exhaust gases. The power which can be generated by secondary turbine 17 and exhaust gas turbine 15 can be fed directly to the internal combustion engine 18 through a power takeoff 31, to drive accessories, or to drive a generator for example.

The function of the embodiment of the invention shown in FIGS. 4 to 6 is as follows:

After internal combustion engine 18 is started, its exhaust gases are fed through exhaust gas inlet stubs 23 to exhaust gas turbine 15 to drive the latter. Exhaust gas turbine 15 drives compressor 16, the latter drawing in air through opening 29 and supplying said air in compressed form through turbine blades 22 to secondary turbine 17, after which the air exits through the openings 27. While the air is flowing through turbine blades 22, exposed to the heat of the exhaust gases, heat exchange takes place between said blades and the air, whereby the compressed air is heated. This air expands in the secondary turbine, releasing power, whereby the power delivered by the exhaust gas turbine unit is considerably increased.

In another embodiment of the invention, the air drawn in by the compressor 16 can be precompressed.

Figure 7:
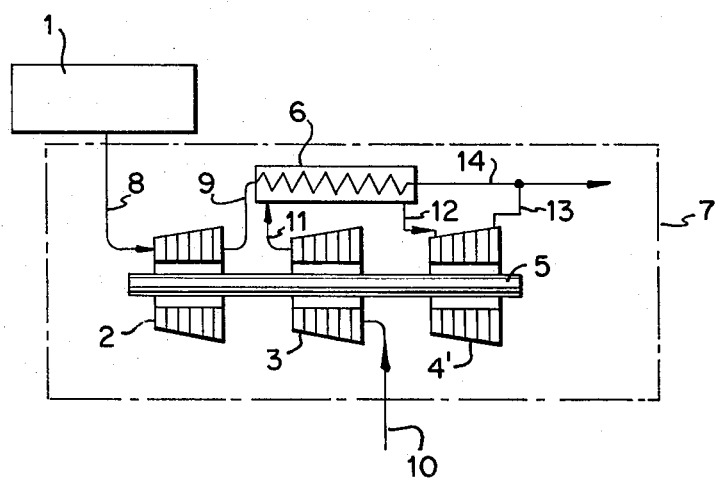
FIG. 7 is a view similar to FIG. 3, showing an embodiment utilizing a radial flow secondary turbine.

FIG. 7 shows a further embodiment which corresponds to the embodiment of FIG. 3 (as indicated by the like reference numerals except that a radial flow turbine 4' is utilized instead of axial flow turbine 4 as the secondary turbine.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A drive assembly, especially for motor vehicles, of the type comprising an internal combustion engine and an exhaust gas turbine unit including an exhaust gas turbine driven by the exhaust gases of the internal combustion engine, a compressor, and a secondary turbine, interconnected with each other, the improvement comprising means for utilizing both the kinetic energy and the heat energy of the exhaust gases of the internal combustion engine by a thermal work process superimposed in said exhaust gas turbine, wherein said means for utilizing comprises said exhaust gas turbine having hollow blade means fluidicly communicating with said compressor and secondary turbine for passing a working medium compressed by the compressor therethrough to said secondary turbine with said medium being in heat exchange relationship with the exhaust gases while in said hollow blade means, and expanding in the secondary turbine and releasing power, and wherein said exhaust turbine unit further comprises:

a housing and a hollow rotatable shaft supported therein, said compressor and turbines being mounted upon said shaft within said housing, an exhaust gas line being connected to a first inlet of said housing, said first inlet communicating the exhaust gases with the interior of said shaft through at least one aperture formed therein, first outlet means for the discharge of said exhaust gases from said shaft and housing, and working medium passage means for passing said working medium into said compressor, from said compressor to secondary turbine in heat transfer relationship with said exhaust gases and out of said housing.

2. A drive assembly according to claim 1, wherein said working medium passage means is formed in part by said hollow turbine blades of said exhaust gas turbine, the interior of said hollow blades being connected at one end with a compressor outlet means and at another end with a secondary turbine inlet means.

3. A drive assembly according to claim 1 or 2, comprising a power takeoff connected to said turbines so as to be driven thereby.

4. Drive assembly according to claim 1 or 2, characterized by the fact that the working medium is air, and comprising means for supplying air to said compressor.

5. Drive assembly according to claim 1 or 2, characterized by the fact that the working medium is steam, and comprising means for supplying steam to said compressor.

6. Drive assembly according to claim 1 or 2, wherein the secondary turbine is a single-stage turbine.

7. Drive assembly according to claim 1 or 2, wherein the secondary turbine is a multi-stage axial turbine.

8. Drive assembly according to claim 1 or 2, wherein the secondary turbine is a radial turbine.

9. Drive assembly according to claim 1 or 2, wherein the exhaust gas turbine unit, including said compressor, exhaust gas turbine and secondary turbine, is made as an integrated unit.

* * * * *